United States Patent
Simchoni (10) Patent No.: US 6,492,635 B2
(45) Date of Patent: Dec. 10, 2002

(54) METHOD AND DEVICE FOR AUTOMATICALLY CONTROLLING A POLARIZING FILTER

(76) Inventor: Dror Simchoni, 6 Ben Hillel St., Ramat Aviv, Tel Aviv 69021 (IL)

( * ) Notice: Subject to any disclaimer, the term of this patent is extended or adjusted under 35 U.S.C. 154(b) by 88 days.

(21) Appl. No.: 09/756,274

(22) Filed: Jan. 9, 2001

(65) Prior Publication Data

US 2002/0088927 A1 Jul. 11, 2002

(51) Int. Cl.[7] ................................................. G02F 1/00
(52) U.S. Cl. ..................................... 250/225; 359/493
(58) Field of Search .......................... 250/225; 359/493, 359/501, 601, 502, 603, 608, 891; 396/544

(56) References Cited

U.S. PATENT DOCUMENTS

| | | | | |
|---|---|---|---|---|
| 5,598,298 A | * | 1/1997 | Whitehead et al. | 356/364 |
| 6,028,303 A | * | 2/2000 | Suzuki | 250/225 |
| 6,137,958 A | * | 10/2000 | Toyoda | 396/166 |

FOREIGN PATENT DOCUMENTS

| | | |
|---|---|---|
| JP | 58052606 | 3/1983 |
| JP | 10319474 | 12/1998 |
| JP | 11218799 | 8/1999 |
| JP | 02000041180 A | * 2/2000 |

* cited by examiner

Primary Examiner—Robert H. Kim
Assistant Examiner—Hoon K. Song
(74) Attorney, Agent, or Firm—Mark M. Friedman (57) ABSTRACT

A method and device for automatically controlling a polarizing filter, featuring automatically sensing, measuring, and analyzing at least one parameter associated with direction of a polarizing filter by an electronic direction/motion sensing mechanism, receiving a signal from the electronic direction/motion sensing mechanism relating to the at least one parameter associated with direction of the polarizing filter by a rotation control circuit, and receiving a signal from the rotation control circuit relating to the at least one parameter associated with direction of the polarizing filter by a polarizing filter rotating mechanism for automatically rotating the polarizing filter. The invention is primarily directed to applications of a polarizing filter in the field of photography, however, it clearly can be directed to applications of a polarizing filter in a variety of other fields involving the use of electromagnetic radiation for viewing, imaging and/or projecting through short or long distances, for example, involving the use of a microscope, binoculars, a telescope, or a laser beam device.

84 Claims, 1 Drawing Sheet

METHOD AND DEVICE FOR AUTOMATICALLY CONTROLLING A POLARIZING FILTER

FIELD AND BACKGROUND OF THE INVENTION

The present invention relates to techniques for controlling a polarizing filter and, more particularly, to a method and device for automatically controlling a polarizing filter. The method and device feature automatically sensing, measuring, and analyzing at least one parameter associated with direction of a polarizing filter by an electronic direction/motion sensing mechanism, receiving a signal from the electronic direction/motion sensing mechanism relating to the at least one parameter associated with direction of the polarizing filter by a rotation control circuit, and receiving a signal from the rotation control circuit relating to the at least one parameter associated with direction of the polarizing filter by a polarizing filter rotating mechanism for automatically rotating the polarizing filter.

Basic principles and details relating to propagating electromagnetic radiation and to polarization of propagating electromagnetic radiation needed for properly understanding the present invention are provided herein. Complete theoretical descriptions, details, explanations, examples, and applications of these and related subjects and phenomena are readily available in standard references in the fields of physics, materials science, optics, photography, and photographic equipment. The present invention is primarily directed to applications of a polarizing filter in the field of photography, however, the present invention clearly can be directed to applications of a polarizing filter in a variety of other fields involving the use of polarized electromagnetic radiation for viewing, imaging and/or projecting through short or long distances, for example, involving the use of a microscope, binoculars, a telescope, or a laser beam device.

Electromagnetic radiation which is unaffected and untreated by external influences, in general, and unpolarized, in particular, such as that of unpolarized light or any other radiation, behaves as a propagating transverse wave vibrating equally and randomly in all directions perpendicular to the direction of propagation. Polarization is generally denoted as the uniform and nonrandom elliptical, circular, or, linear or planar, variation of the vibrational orientation of the wave motion of such electromagnetic radiation. Linear or plane polarized electromagnetic radiation occurs when all the vibrating electromagnetic field components of the propagating electromagnetic radiation are oriented in the same direction. A simple way of describing this phenomenon is by considering the wave motion of electromagnetic radiation as a vector sum of two such vibrations in perpendicular planes, vibrating perpendicular to the direction of propagation, whereby linear or plane polarized electromagnetic radiation results when one of the two components is partly or entirely removed from the propagating wave motion of the electromagnetic radiation.

Sources of unpolarized electromagnetic radiation can be naturally existing, such as the sun or the moon, or, can be man made, such as a manufactured electromagnetic radiation source, for example, a device generating a highly focused or coherent beam of electromagnetic radiation, such as a laser beam, or, a device generating spread out or diffuse electromagnetic radiation, such as an incandescent lamp, a fluorescent lamp, an infra-red lamp, an ultra-violet lamp, or, a device generating a combination of focused and diffuse electromagnetic radiation, such as a photographic flash lamp, spot light, or flood light. Unpolarized electromagnetic radiation can be linearly or plane polarized by any of various linear or plane polarizing mechanisms, the most well known and characterized being absorption, scattering, or reflection, each of which is basically described herein.

In the linear or plane polarizing mechanism involving absorption, unpolarized propagating electromagnetic radiation, originating from a natural source or a man made source, is directed into a medium having a unique structure which passes or transmits incident electromagnetic radiation polarized in one direction, commonly referred to as the 'passing direction', while strongly absorbing or 'blocking' electromagnetic radiation polarized in the perpendicular, or 'blocking', direction. Accordingly, such a linear or plane polarizing medium functions as a special type of filter, commonly referred to as a 'polarizing filter', for blocking or filtering out a selected part, or fraction, of the incident electromagnetic radiation. A single polarizing filter polarizes up to a maximum of half the intensity of unpolarized electromagnetic radiation, and, depending upon the relative angular orientation of the polarizing planes of two polarizing filters placed in series, transmission of electromagnetic radiation, initially unpolarized when directed into the first polarizing filter, successively passing through the second polarizing filter can be controlled down to a minimum of zero if the double polarization is complete, in accordance with the well known Malus cosine-squared law.

Different types of media, such as a polarizing prism, or, a polarizing sheet, which are widely used as polarizing filters, are known for producing absorption type of linear or plane polarization of electromagnetic radiation. A polarizing prism is made of a material, for example, calcite, whose crystal structure exhibits double refraction or birefringent characteristics, whereby the crystal structure has a different index of refraction for each direction or plane of polarization. Since electromagnetic radiation of one polarization is bent more strongly than the other, it is possible to separate the polarized components by total internal reflection, for example, by using a Nicol prism, or, a Glan-Thompson prism, or, by deviation in different directions, for example, by using a Rochon prism, or, a Wollaston prism. A polarizing sheet, for example, any one of the variety of different types of polarizing sheets manufactured by the Polaroid Corporation, USA, is made by aligning microscopic crystals of an appropriate material in a suitable base.

A special case of polarizing electromagnetic radiation is when linear or plane polarized electromagnetic radiation such as light traverses a crystal such as calcite perpendicular to its axis, the light is transformed into elliptically polarized, or, circularly polarized light.

In the field of physics, in general, and materials science, in particular, linear or plane polarizing media are used for producing a well defined and characterized source of polarized electromagnetic radiation, such as that produced by placing an appropriately designed and constructed polarizing filter in front of the beam of a source of electromagnetic radiation such as a laser device, for studying electronic structure, properties, and behavior of materials.

In the field of photography, propagating electromagnetic radiation in the form of scattered light, glare or intense light, and other strong reflections of light, often interfere with the photographic process and degrade photographs in many ways, for example, by diluting colors, by obscuring or distracting a photographer from important image details, or by forcing less than optimal exposure compromises.

Fortunately, for photographers, such 'interfering light' is associated with varying degrees of polarization, and this association provides a relatively easy way to eliminate, minimize, or, exploit, the 'interfering light', by using a polarizing filter set at optimum or strategic polarizing angles, while capturing the remaining desired light required for the photographic process.

In the linear or plane polarizing mechanism involving scattering, unpolarized propagating electromagnetic radiation, originating from a natural source or a man made source, is directed into a medium which absorbs and re-radiates or scatters the incident electromagnetic radiation, such that the scattered electromagnetic radiation leaving the medium is strongly polarized in the direction perpendicular to the incident direction of propagation. Gas phase media, for example, the atmosphere containing gas molecules, water droplets, and other airborne particles, absorb and scatter electromagnetic radiation, and are known for producing scattering type of linear or plane polarization of electromagnetic radiation.

Of importance to photographers is that atmospheric scattering of sunlight is least at local noon in clean, dry air, resulting in a sharp deep blue color of the sky, whereas, late sunlight skimming the horizon loses much of its blue-green content to scatter along its long path through the lower atmosphere before reaching a viewer, resulting in red-yellow sunsets. Adding moisture or particulates to the atmosphere substantially increases scattering efficiency at longer, redder, wavelengths. With more colors represented in their scattered light, clouds look white, and hazy (damp or smoggy) skies take on a grayish to whitish cast. Accordingly, bright white scattered light directed into a camera effectively mutes or desaturates all the colors in a particular scene, especially the blue of the sky, whereas, bright blue scattered light effectively desaturates all other colors. Fortunately, scattered electromagnetic radiation, such as scattered light, is strongly polarized perpendicular to the incident direction of the unpolarized electromagnetic radiation propagating from a light source such as the sun, the moon, or, a photographic flash lamp, at all wavelengths. Here, the polarization mechanism of scattered light enables differentiating interfering scattered light from desirable and largely unpolarized light reflected from photographic subjects or objects.

In the linear or plane polarizing mechanism involving reflection, unpolarized propagating electromagnetic radiation, originating from a natural source or a man made source, is directed at an angle of incidence onto the surface of a medium which reflects or polarizes more of the incident electromagnetic radiation in the direction perpendicular to the plane of incidence, that is, parallel or tangential to the reflecting surface of the medium, than in the direction of the plane of incidence, and, refracts, by transmitting or absorbing, according to the physicochemical and optical properties of the medium, a fraction of the incident electromagnetic radiation into the medium in the plane perpendicular to the direction of reflection. Here, according to standard definitions, the angle of incidence is the angle between the path of the incident electromagnetic radiation and the normal or perpendicular to the reflecting surface at the point of reflection, the angle of reflection is the angle between the normal or perpendicular to the reflecting surface of the medium and the path of the reflected light at the point of reflection, and, the plane of incidence is the plane containing components of incident and reflected electromagnetic radiation and is always normal or perpendicular to the reflecting surface at least at the point of reflection.

At a certain angle of incidence, well known as Brewster's angle, for such a reflecting medium, the reflected electromagnetic radiation is entirely polarized and reflected perpendicular to the plane of incidence, that is, parallel or tangential to the reflecting surface of the medium, because the component of the incident electromagnetic radiation ordinarily reflected in the direction of the plane of incidence is completely refracted into the medium. For photographic applications taking place in air, the Brewster's angle of most such reflecting surfaces is approximately 55 degrees. At other angles of incidence, reflected light from the surfaces of such media is only partially polarized, but the net polarization remains tangential to the reflecting surface.

Non-metallic or dielectric media which feature a generally smooth or polished reflecting surface, such as a sheet or plate of glass, a clean or polished non-metallic table-top, water, a wet non-metallic surface, foliage, or, non-metallic car paint, are known for producing reflection type of linear or plane polarization of electromagnetic radiation. Reflections from such types of surfaces are also commonly referred to as specular reflections. Unpolarized electromagnetic radiation reflected by smooth metallic surfaces, or, reflected by rough surfaces such as rocks, trees, animals, or dirt, essentially remains unpolarized. However, when linear or plane polarized electromagnetic radiation, such as light, is incident upon a polished metallic surface, the orientation of the propagating wave motion is generally transformed from a rectilinear to an elliptic one, and the light becomes elliptically polarized.

As indicated above, a single polarizing filter polarizes up to a maximum of half the intensity of unpolarized electromagnetic radiation, and, depending upon the relative angular orientation of the polarizing planes of two polarizing filters placed in series, transmission of electromagnetic radiation, initially unpolarized when directed into the first polarizing filter, successively passing through the second polarizing filter can be controlled down to a minimum of zero if the double polarization is complete. Based on this phenomena, and on the absorption, scattering and reflecting mechanisms involving linear or plane polarized electromagnetic radiation, polarized components of scattered or reflected electromagnetic radiation can also be polarized by directing such polarized components into a polarizing filter, for partly or entirely removing these polarized components from the electromagnetic radiation exiting the polarizing filter, which is a powerful tool used in a variety of fields, especially in photography.

Accordingly, properly controlling position and angular orientation settings of a polarizing filter are advantageously used in a variety of applications for effectively and efficiently controlling and exploiting propagating electromagnetic radiation, in general, and linear or plane polarized components of propagating electromagnetic radiation, in particular. Especially in the field of photography, a polarizing filter attached or connected to a camera properly positioned and oriented relative to a source of electromagnetic radiation and subjects and objects being photographed, and, set at optimum or strategic polarizing angles, is used for eliminating, minimizing, or exploiting, the above described polarized components of scattered and reflected 'interfering light', for substantially improving photographic results, by improving saturation of desirable colors, by enabling a photographer to concentrate better on important image details during focusing and imaging procedures, by enabling a photographer to use optimal exposure settings, and by enabling a photographer to utilize a variety of special artistic and creative photographic techniques and effects not possible without the presence of such polarized light.

As indicated above, the present invention is primarily directed to applications of a polarizing filter in the field of photography, accordingly, prior art teachings of controlling a polarizing filter summarized below relate to the field of photography. In photography, for dealing with the effects of 'interfering light' caused by scattering and reflections, typically, a polarizing filter is attached or connected to the front of the camera lens barrel, the camera and the attached polarizing filter are strategically positioned relative to a light source and subjects and objects of a scene, and the polarizing filter is then manually rotated by the photographer to a particular angle for eliminating, minimizing, or exploiting, the intensity of the interfering light. There are prior art teachings of various methods and devices for manually using or controlling a polarizing filter attached to a camera.

In Japanese Patent No. JP58052606, issued to Tooru et al., there is disclosed a device attached to a photographic lens barrel, wherein a polarizing filter is manually rotated by turning a knob whose opposite end is part of a gear mechanism including a filter frame holding the polarizing filter.

In Japanese Patent No. JP10319474, issued to Tomoaki, there is disclosed a polarizing filter frame attached to a photographic lens barrel, wherein a polarizing filter is manually rotated by rotating a polarizing filter holding frame with respect to the polarizing filter frame, such that rotation of the polarizing filter holding frame is separate from rotation of the focusing mechanism. In this disclosure, the device enables rotating and fixing the position of a polarizing filter separate from using the focusing mechanism of a camera.

In Japanese Patent No. JP11218799, issued to Kunio, there is disclosed a device attached to a camera, whereby rotating a wheel while pressing it against the outer peripheral surface of a polarizing filter, enables rotating of the polarizing filter.

The most significant limitation of each of these teachings is the necessity of manually rotating and/or adjusting the polarizing filter or polarizing filter mechanism, according to desired extent of decreasing or exploiting interfering light intensity, prior to photographing a scene. The photographic process becomes quite cumbersome when there is a need for manually rotating and properly adjusting the polarizing filter for attempting to achieve optimum results in addition to the simultaneous need for focusing subjects and objects of a scene to be photographed. Clearly, this limitation is even more pronounced for a photographer using a photographic 'panning' technique, whereby a camera is discontinuously or continuously panned or rotated about an axis of rotation of the camera in a horizontal plane, while photographing different fields of view of the scene. This important limitation affects novice as well as professional photographers.

Overcoming the described limitation of having to manually rotate and/or adjust the polarizing filter or polarizing filter mechanism during the photographic process is addressed in U.S. Pat. No. 6,028,303, issued to Suzuki. There is disclosed a polarizing filter control mechanism used in a camera that automatically rotates a polarizing filter in order to minimize the effects of reflected light on a photographic image. An imaging element, positioned on the camera head of a camera, obtains an image signal proportional to the intensity of reflected light entering the camera lens. The image signal is electrically converted into a level detection signal which is sent to a minimum value detection unit, whereby the level detection signal is compared to a reference signal for producing a corresponding error signal. A drive control unit rotates the polarizing filter until the difference between the level detection signal and the reference signal is minimized. A significant limitation of this device is the need for designing and using relatively sophisticated, and probably costly, electronics and optics for the imaging element and associated components of the device. Another limitation is the uncertainty involved with respect to applying the invention to different types of cameras.

To one of ordinary skill in the art, there is thus a need for, and it would be useful to have a method and device for automatically controlling a polarizing filter. Moreover, there is a need for such a method and device capable of automatically sensing, measuring, and analyzing at least one parameter associated with direction of a polarizing filter by an electronic direction/motion sensing mechanism, for automatically actuating a polarizing filter rotating mechanism which automatically rotates the polarizing filter. Furthermore, there is a need for such a method and device which are relatively simple and inexpensive to implement, and which are generally applicable in the field of photography and in a variety of other fields involving the use of polarized electromagnetic radiation for viewing, imaging and/or projecting through short or long distances, for example, involving the use of a microscope, binoculars, a telescope, or a laser beam device.

SUMMARY OF THE INVENTION

The present invention relates to a method and device for automatically controlling a polarizing filter. In general, the invention features automatically sensing, measuring, and analyzing at least one parameter associated with direction of a polarizing filter by an electronic direction/motion sensing mechanism, receiving a signal from the electronic direction/motion sensing mechanism relating to the at least one parameter associated with direction of the polarizing filter by a rotation control circuit, and receiving a signal from the rotation control circuit relating to the at least one parameter associated with direction of the polarizing filter by a polarizing filter rotating mechanism for automatically rotating the polarizing filter. In particular, the invention features an electronic direction/motion sensing mechanism automatically sensing and measuring the amount of horizontal shift in the direction of the polarizing filter when an electromagnetic radiation receiver, such as a camera or an object exposed to a laser beam, hosting the polarizing filter, rotates around one of its vertical axes, such as by panning a camera, and converts the measured amount of shift into a signal for automatically actuating a polarizing filter rotating mechanism which automatically rotates the polarizing filter around its optical axis.

Thus, according to the present invention, there is provided a method for automatically controlling a polarizing filter, the method comprising the steps of: (a) sensing, measuring, and analyzing at least one parameter associated with direction of the polarizing filter by an electronic direction/motion sensing mechanism; (b) receiving a signal from the electronic direction/motion sensing mechanism relating to the at least one parameter associated with direction of the polarizing filter by a rotation control circuit; and (c) receiving a signal from the rotation control circuit relating to the at least one parameter associated with direction of the polarizing filter by a polarizing filter rotating mechanism for automatically rotating the polarizing filter.

According to another aspect of the present invention, there is provided a device for automatically controlling a polarizing filter, comprising: (a) an electronic direction/motion sensing mechanism for sensing, measuring, and analyzing at least one parameter associated with direction of the polarizing filter; (b) a rotation control circuit for receiving a signal from the electronic direction/motion sensing mechanism relating to the at least one parameter associated with direction of the polarizing filter; and (c) a polarizing filter rotating mechanism for receiving a signal from the rotation control circuit relating to the at least one parameter associated with direction of the polarizing filter for automatically rotating the polarizing filter.

According to another aspect of the present invention, there is provided a device for automatically controlling a polarizing filter associated with an electromagnetic radiation receiver, the polarizing filter polarizes electromagnetic radiation propagating into the polarizing filter for forming polarized electromagnetic radiation received by the electromagnetic radiation receiver, the device comprising: (a) an electronic direction/motion sensing mechanism for sensing, measuring, and analyzing at least one parameter associated with direction of the polarizing filter; (b) a rotation control circuit for receiving a signal from the electronic direction/motion sensing mechanism relating to the at least one parameter associated with direction of the polarizing filter; and (c) a polarizing filter rotating mechanism for receiving a signal from the rotation control circuit relating to the at least one parameter associated with direction of the polarizing filter for automatically rotating the polarizing filter associated with the electromagnetic radiation receiver.

According to another aspect of the present invention, there is provided a device for automatically controlling a polarizing filter associated with a photographic device, the polarizing filter polarizes electromagnetic radiation propagating into the polarizing filter for forming polarized electromagnetic radiation received by the photographic device, the device comprising: (a) an electronic direction/motion sensing mechanism for sensing, measuring, and analyzing at least one parameter associated with direction of the polarizing filter; (b) a rotation control circuit for receiving a signal from the electronic direction/motion sensing mechanism relating to the at least one parameter associated with direction of the polarizing filter; and (c) a polarizing filter rotating mechanism for receiving a signal from the rotation control circuit relating to the at least one parameter associated with direction of the polarizing filter for automatically rotating the polarizing filter associated with the photographic device.

According to another aspect of the present invention, there is provided a device for automatically controlling a polarizing filter associated with a laser beam device, the polarizing filter polarizes electromagnetic radiation generated by the laser beam device for forming polarized laser beam electromagnetic radiation, the device comprising: (a) an electronic direction/motion sensing mechanism for sensing, measuring, and analyzing at least one parameter associated with direction of the polarizing filter; (b) a rotation control circuit for receiving a signal from the electronic direction/motion sensing mechanism relating to the at least one parameter associated with direction of the polarizing filter; and (c) a polarizing filter rotating mechanism for receiving a signal from the rotation control circuit relating to the at least one parameter associated with direction of the polarizing filter for automatically rotating the polarizing filter associated with the laser beam device.

According to another aspect of the present invention, there is provided a method for automatically controlling a polarizing filter, the polarizing filter polarizes electromagnetic radiation propagating into the polarizing filter for forming polarized electromagnetic radiation received by an electromagnetic radiation receiver, the method comprising the steps of: (a) sensing, measuring, and analyzing at least one parameter relating to a shift in direction of the polarizing filter caused by rotating the electromagnetic radiation receiver around an axis of rotation of the electromagnetic radiation receiver, by an electronic direction/motion sensing mechanism, for generating an electronic signal relating to the shift, where the electronic direction/motion sensing mechanism is physically connected and fixed to the electromagnetic radiation receiver; (b) receiving the electronic signal from the electronic direction/motion sensing mechanism relating to the shift in the direction of the polarizing filter, by a rotation control circuit, for generating a control signal relating to angular positions and rotation of the polarizing filter; and (c) receiving the control signal from the rotation control circuit by a polarizing filter rotating mechanism for automatically rotating the polarizing filter around an optical axis of the polarizing filter to a pre-determined angular position.

According to another aspect of the present invention, there is provided a device for automatically controlling a polarizing filter, the polarizing filter polarizes electromagnetic radiation passing through the polarizing filter for forming polarized electromagnetic radiation received by an electromagnetic radiation receiver, comprising: (a) a polarizing filter frame for holding the polarizing filter, where the polarizing filter frame is connected and fixed to the electromagnetic radiation receiver; (b) an electronic direction/motion sensing mechanism for sensing, measuring, and analyzing at least one parameter relating to a shift in direction of the polarizing filter caused by rotating the electromagnetic radiation receiver around an axis of rotation of the electromagnetic radiation receiver, and for generating an electronic signal relating to the shift, where the electronic direction/motion sensing mechanism is connected and fixed to the electromagnetic radiation receiver; (c) connecting and fixing elements for connecting and fixing the polarizing filter frame and the electronic direction/motion sensing mechanism to the electromagnetic radiation receiver; (d) a rotation control circuit for receiving the electronic signal from the electronic direction/motion sensing mechanism relating to the shift in the direction of the polarizing filter, and for generating a control signal relating to angular positions and rotation of the polarizing filter within the polarizing filter frame; and (e) a polarizing filter rotating mechanism for receiving the control signal from the rotation control circuit, for automatically rotating the polarizing filter around an optical axis of the polarizing filter to a pre-determined angular position.

The method and device of the present invention serve as significant improvements over currently used techniques for controlling a polarizing filter used in a variety of fields such as physics, materials science, optics, and photography. The present invention is generally applicable to essentially any type of electromagnetic radiation receiver, such as a camera, and is relatively simple and inexpensive to implement.

BRIEF DESCRIPTION OF THE DRAWING

The invention is herein described, by way of example only, with reference to the accompanying drawing, wherein.

DESCRIPTION OF THE PREFERRED EMBODIMENTS

The present invention relates to a method and device for automatically controlling a polarizing filter. The general aspect of novelty of the present invention is sensing, measuring, and analyzing at least one parameter associated with direction of a polarizing filter by an electronic direction/motion sensing mechanism featuring an electronic direction/motion sensor and computerized electronic circuitry, whereby a signal sent by the electronic direction/motion sensing mechanism relating to the at least one parameter associated with direction of the polarizing filter is received by a rotation control circuit which generates and sends a control signal, featuring data and/or information relating to angular positions and rotation of the polarizing filter, to a polarizing filter rotating mechanism for automatically rotating the polarizing filter.

It is to be understood that the invention is not limited in its application to the details of construction, arrangement, and composition of the components set forth in the following description, drawing, or examples. For example, the following description emphasizes applications relating to the use of an electromagnetic radiation receiver, such as in the field of photography, for example, a camera, in order to illustrate implementation of the present invention, however, the invention is capable of other embodiments or of being practiced or carried out in various ways. The present invention clearly can be directed to applications of a polarizing filter in a variety of other fields involving the use of electromagnetic radiation for viewing, imaging and/or projecting through short or long distances, for example, involving the use of a microscope, binoculars, a telescope, or a laser beam device. Also, it is to be understood that the phraseology and terminology employed herein are for the purpose of description and should not be regarded as limiting.

Steps, components, operation, and implementation of a method and device for automatically controlling a polarizing filter according to the present invention are better understood with reference to the following description and accompanying drawing.

Figure 1:
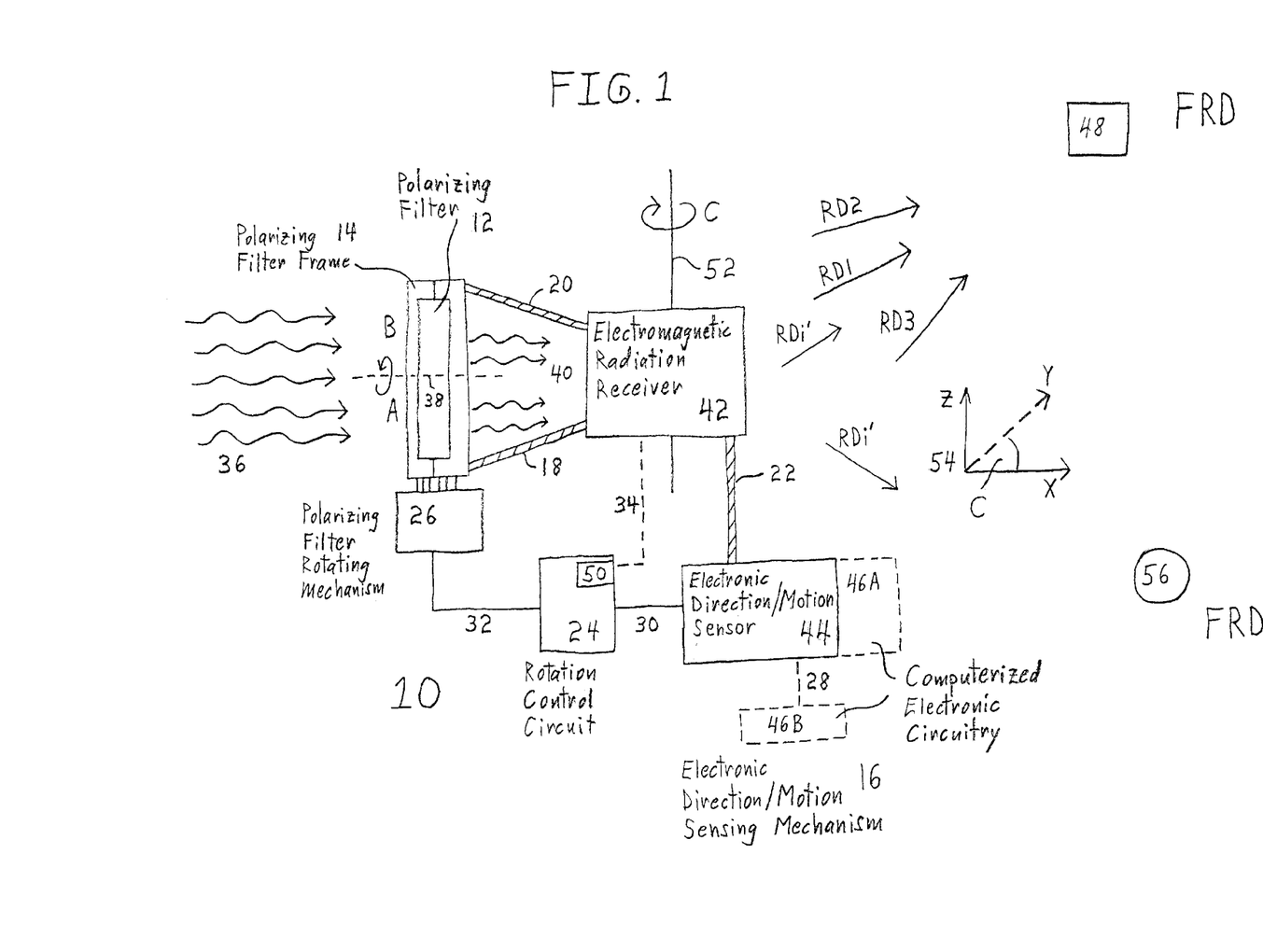
FIG. 1 is a schematic diagram illustrating a side view of an exemplary preferred embodiment of the device, generally referred to as device 10, in relation to other objects and features, for automatically controlling a polarizing filter, in accordance with the present invention.

Referring now to the drawing, FIG. 1 is a schematic diagram illustrating a side view of an exemplary preferred embodiment of the device, generally referred to as device 10, in relation to other objects and features, for automatically controlling a polarizing filter, hereinafter referred to as polarizing filter 12, in accordance with the present invention. Device features the following primary components: (a) a polarizing filter frame 14, (b) an electronic direction/motion sensing mechanism 16, (c) connecting and fixing elements 18, 20, and 22, (d) a rotation control circuit 24, and (e) a polarizing filter rotating mechanism 26. Device 10 further includes control/data links 28, 30, 32, and optionally, 34, for enabling correspondingly wired and/or wireless electronic communication and interaction among the primary components of device 10. Each primary component, and additional components, needed for enabling the use of device 10 are described in the following detailed description of the method of the present invention.

In Step (a), of the method of the present invention, there is providing incident electromagnetic radiation propagating into the polarizing filter, for forming polarized electromagnetic radiation received by an electromagnetic radiation receiver mechanically connected and fixed to a polarizing filter frame and to an electronic direction/motion sensing mechanism.

In FIG. 1, incident electromagnetic radiation 36 propagating into polarizing filter 12 is either unpolarized electromagnetic radiation or polarized electromagnetic radiation. The source (not shown) of incident electromagnetic radiation 36 is naturally existing, such as the sun or the moon, or, can be man made, such as a manufactured electromagnetic radiation source, for example, a device generating a highly focused or coherent beam of electromagnetic radiation, such as a laser beam, or, a device generating spread out or diffuse electromagnetic radiation, such as an incandescent lamp, a fluorescent lamp, an infra-red lamp, an ultra-violet lamp, or, a device generating a combination of focused and diffuse electromagnetic radiation, such as a photographic flash lamp, spot light, or flood light.

For incident electromagnetic radiation 36 being polarized electromagnetic radiation, the mechanism polarizing incident electromagnetic radiation 36 prior to propagating into polarizing filter 12 is one or a combination of absorption, scattering, and reflecting mechanisms, as previously described in the Background. Moreover, according to the polarizing mechanism, incident electromagnetic radiation 36 can be linearly or planar polarized, circularly polarized, or elliptically polarized, prior to propagating into polarizing filter 12.

In particular, for any of the above listed sources of incident electromagnetic radiation 36, with respect to applying the absorption mechanism, a polarizing filter (not shown) separate from polarizing filter 12, is used for polarizing incident electromagnetic radiation 36 prior to propagating into polarizing filter 12. With respect to the scattering mechanism, a gas phase medium (not shown), for example, the atmosphere containing gas molecules, water droplets, and other airborne particles, absorbing and scattering incident electromagnetic radiation 36, is used for polarizing incident electromagnetic radiation 36 prior to propagating into polarizing filter 12. With respect to the reflecting mechanism, a non-metallic or dielectric medium (not shown) featuring a generally smooth or polished reflecting surface, such as a sheet or plate of glass, a clean or polished non-metallic table-top, water, a wet non-metallic surface, foliage, or, non-metallic car paint, reflecting incident electromagnetic radiation 36, is used for polarizing incident electromagnetic radiation 36 prior to propagating into polarizing filter 12.

Polarizing filter 12, featuring an optical axis, for example, optical axis 38 (indicated by dashed line 38 in FIG. 1), perpendicularly passing through the thickness or depth, also referred to as face, of polarizing filter 12, is selected from the group consisting of linear or plane polarizing filters, circular polarizing filters, and elliptical polarizing filters, and is for linearly or plane polarizing, circularly polarizing, or elliptically polarizing, respectively, incident electromagnetic radiation 36. Moreover, polarizing filter 12 polarizes incident electromagnetic radiation 36 according to a polarizing mechanism selected from the group consisting of absorption mechanism, scattering mechanisms, and reflecting mechanisms. The fraction, F, of incident electromagnetic radiation 36 polarized by polarizing filter 12 for forming polarized electromagnetic radiation 40, received by an electromagnetic radiation receiver, hereinafter referred to as electromagnetic radiation receiver 42, is in the range of between 0 and 1, according to the type and configuration of polarizing filter 12, and, according to the direction and orientation or angular position of polarizing filter 12 relative to incident electromagnetic radiation 36.

Polarizing filter 12 is made of a medium selected from the group consisting of polarizing prisms and polarizing sheets. As a polarizing prism, polarizing filter 12 is made of a crystalline material, such as calcite, whose crystal structure exhibits double refraction or birefringent characteristics. Exemplary polarizing prisms which can be used for polarizing filter 12 are a Nicol prism, a Glan-Thompson prism, a Rochon prism, and a Wollaston prism. An exemplary polarizing sheet which can be used for polarizing filter 12 is any one of the variety of different types of polarizing sheets manufactured by the Polaroid Corporation, USA, made by aligning microscopic crystals of an appropriate material in a suitable base. For application of the present invention where electromagnetic radiation receiver 42 is a camera, polarizing filter 12 is preferably a polarizing sheet designed, configured, and made of standard materials used in the art of manufacturing photographic equipment such as a polarizing filter.

Electromagnetic radiation receiver 42 is a device, mechanism, component, element, or object, which is designed, constructed, and operable for receiving and utilizing or processing polarized electromagnetic radiation 40, either separate from, or in addition to, other structure and/or functionality which may be associated with such a device, mechanism, component, element, or object, serving as electromagnetic radiation receiver 42. For example, electromagnetic radiation receiver 42 is a device selected from the group consisting of a mechanical device, an electrical device, an electronic device, an optical device, an electromechanical device, an electro-optical device, featuring components and elements for receiving and utilizing or processing incident electromagnetic radiation 36.

A more specific example is where electromagnetic radiation receiver 42 is a photographic device such as a camera, where the camera is used for photographing still pictures and/or moving pictures. Accordingly, the camera is either a still picture camera, a video camera, or a film camera. Alternatively, electromagnetic radiation receiver 42 is a device which uses incident electromagnetic radiation 36 for viewing, imaging and/or projecting through short distances, for example, a microscope, or, for viewing, imaging, and/or projecting through long distances, for example, a binoculars or a telescope.

Electromagnetic radiation receiver 42 is mechanically connected and fixed to polarizing filter frame 14 and to electronic direction/motion sensing mechanism 16, by connecting and fixing elements 18 and 20, and, 22, respectively. Mechanical connection and fixing of electromagnetic radiation receiver 42 to polarizing filter frame 14 and to electronic direction/motion sensing mechanism 16 are needed for performing Step (b) of the method, involving setting electromagnetic radiation receiver 42, and therefore, setting connected and fixed electronic direction/motion sensing mechanism 16, and, setting connected and fixed polarizing filter frame 14, at reference directions relative to a fixed reference direction, hereinafter referred to as FRD, as shown in FIG. 1.

Polarizing filter frame 14 is for holding polarizing filter 12, and when operatively connected to a polarizing filter rotating mechanism, such as polarizing filter rotating mechanism 26, assists in rotating polarizing filter 12 around optical axis 38. Polarizing filter frame 14 is made of one or more materials selected from the group consisting of metallic materials and non-metallic materials. Preferably, polarizing filter frame 14 holds the peripheral surface or edges of polarizing filter 12. For application of the present invention where electromagnetic radiation receiver 42 is a camera 42, polarizing filter frame 14 is designed, configured, and made of standard materials used in the art of manufacturing photographic equipment for holding a polarizing filter, such as polarizing filter frame 14.

Electronic direction/motion sensing mechanism 16 is an electronically operating electro-mechanical mechanism which senses, measures, and analyzes, at least one parameter associated with direction of polarizing filter 12 selected from the group consisting of direction, position, change in direction, change in position, and motion. Specifically, electronic direction/motion sensing mechanism 16 senses, measures, and analyzes, these parameters by electronic operation of electromechanical components and elements which function according to the laws and principles of natural phenomena selected from the group consisting of electricity, magnetism, gravity, motion, inertia, precession, propagation of electromagnetic radiation, and optics. Details and background of the theory, laws, principles, applications of, and, techniques for sensing and measuring, these natural phenomena, are readily available in standard physics and electronics references. Basic principles and details of structure/function and of using electronic direction/motion sensing mechanisms required for properly understanding and implementing the present invention are provided herein.

Electronic direction/motion sensing mechanism 16 is an electronically operating electromechanical mechanism featuring an electronic direction/motion sensor 44 and computerized electronic circuitry 46A or 46B, where the computerized electronic circuitry is either physically part of electronic direction/motion sensing mechanism 16, as shown by dashed line box 46A, or, is physically separate from and electronically linked, by way of control/data links 28, to electronic direction/motion sensing mechanism 16, as shown by dashed line box 46B.

Electronic direction/motion sensor 44 is selected from the group consisting of electronic direction sensors, electronic position sensors, electronic direction change sensors, electronic position change sensors, electronic motion sensors, electronic inertial sensors, and electronic precession sensors. More specifically, electronic direction/motion sensor 44 is selected from the group consisting of electronic magnetic sensors, electronic magneto-inductive sensors, electronic compass sensors, electronic gyroscope sensors, electronic gyrocompass sensors, electronic gyroradiation sensors, electronic radiocompass sensors, and electronic lasergyro sensors. All of these types of electronic direction/motion sensors are taught about in prior art, and are readily procurable from the electronics marketplace. Accordingly, only basic descriptions of these electronic direction/motion sensors are provided herein.

Electronic magnetic sensors, electronic magneto-inductive sensors, and electronic compass sensors, function according to the laws and principles of electricity and magnetism. Typically, these electronic direction/motion sensors have the shape of a small cylinder about 15 mm high and about 13 mm in diameter, weighing up to a few grams, and include a tiny magnet and two magneto-inductive, for example, Hall-effect, sensors. The magnet is free to rotate around its vertical axis and point towards north under the influence of the earth's magnetic field. The two magneto-inductive or Hall-effect sensors are mounted around the tiny magnet, perpendicular to each other. When the magnet rotates the outputs of the two magneto-inductive sensors describe a couple of sine and cosine curves that, using a power supply of about 5 volts, have an average value of about 2.5 volts and swing between about 2.8 volts and about 3.2 volts. The output is analog or digital and is in the form of either a compass heading or magnetic field data. Typically, these types of electronic direction/motion sensors include a built-in hard iron calibration algorithm which compensates affects caused by magnetic fields generated by a host device or system. Additionally, these types of electronic direction/motion sensors are operable in a wide temperature range, for example, from about −20 degrees C. to about +85 degrees C.

Electronic gyroscope sensors and electronic gyrocompass sensors, also referred to as electronic 'gyro' sensors, function according to the laws and principles of electricity, gravity, motion, inertia, and precession. Typically, these electronic direction/motion sensors include a small spinning mass, such as a disk or a wheel, the spin axis of which turns between two low-friction supports and maintains its angular orientation with respect to inertial coordinates when not subjected to external torques. An electronic gyrocompass sensor, actually being a special type of electronic gyroscope sensor, features a gyroscope or gyro, mounted in a set of gimbals (a device consisting of two rings mounted on axes at right angles to each other so that an object, such as a compass or a gyroscope, remains suspended in a horizontal plane between them regardless of the motion of a device hosting the object, in this case, the electronic gyrocompass sensor), whereby the interaction of the gyroscope's angular momentum with the force produced by the earth's rotation is used to maintain a north-south orientation of the gyroscopic spin axis, thereby providing a stable directional reference. The output of these electronic direction/motion sensors is analog or digital representing direction and/or position coordinates.

Electronic gyroradiation sensors, electronic radiocompass sensors, and electronic lasergyro sensors, function according to the laws and principles of electricity, gravity, motion, inertia, precession, propagation of electromagnetic radiation, and optics. Typically, these electronic direction/ motion sensors include mechanisms and components for generating, sensing, and measuring parametric, for example, frequency, wavelength, direction, orientation, changes in the wave motion of propagating electromagnetic radiation, for sensing, measuring, and indicating changes in direction and/or motion of a host object such as a device. The output of these electronic direction/motion sensors is analog or digital representing direction and/or position coordinates.

Referring again to device 10 of FIG. 1, computerized electronic circuitry 46A or 46B, either physically part of electronic direction/motion sensing mechanism 16, or, physically separate from and electronically linked to electronic direction/motion sensing mechanism 16, respectively, includes a variety of different types of standard and readily procurable electronic and computerized software and hardware devices, mechanisms, components, elements, and packages, required for electronically communicating and interacting with electronic direction/motion sensor 44, and required for electronically communicating and interacting with rotation control circuit 24. The electronic communication and interaction includes methods, procedures, and functions for programming, controlling, computing, analyzing analog/digital data and information, processing analog/ digital data and information, inputting or receiving analog/ digital data and information, generating analog/digital data and information, outputting or sending analog/digital data and information, and storing analog/digital data and information.

The output of any of the above described electronic direction/motion sensors used as electronic direction/motion sensor 44 in electronic direction/motion sensing mechanism 16 is analyzed and processed by computerized electronic circuitry 46 for determining at least one parameter associated with direction selected from the group consisting of direction, position, change in direction, change in position, and motion, in general, and a parameter, $S_H$, in particular, corresponding to a determinable amount of horizontal shift in the directions, for example, by rotation, of electromagnetic radiation receiver 42, polarizing filter frame 14 holding polarizing filter 12, and electronic direction/motion sensing mechanism 16, relative to pre-determined and set reference directions. From this parametric determination, an analog or digital signal is generated and sent by computerized electronic circuitry 46 to rotation control circuit 24, by way of control/data links 30, which then generates and sends an appropriate control signal to polarizing filter rotating mechanism 26 for automatically rotating polarizing filter 12 around optical axis 38.

In device 10 of FIG. 1, connecting and fixing elements 18, 20, and 22, are elements selected from the group consisting of metal elements and non-metal elements, which function by physically and firmly connecting and fixing objects to each other. More specifically, connecting and fixing elements 18, 20, and 22 are selected from the group consisting of screws, nuts, bolts, washers, nails, wire, rods, tubes, connectors, plates, glue, tape, and similar types of elements which can be used for physically and firmly connecting and fixing electromagnetic radiation receiver 42 to polarizing filter frame 14 and to electronic direction/motion sensing mechanism 16.

For application of the present invention where electromagnetic radiation receiver 42 is a camera 42, connecting and fixing elements 18 and 20 are standard components used in the art of manufacturing photographic equipment for connecting and fixing a polarizing filter frame, such as polarizing filter frame 14, to camera 42, in general, and to the lens barrel of camera 42, in particular, and, connecting and fixing element 22 is a standard component used in the art of manufacturing photographic equipment for connecting and fixing an electronic device or mechanism, smaller than a camera, such as electronic direction/motion sensing mechanism 16, to a camera. In principle, electronic direction/motion sensing mechanism 16 can be connected and fixed to any side, that is, the back, a length or long side, the top, the front, of camera 42, but, preferably, is connected to either one of the length or long sides, or, is connected to the bottom, of camera 42.

Control/data links 28, 30, 32, and optionally, 34, are wired and/or wireless, and are designed, configured, and made for enabling wired and/or wireless electronic communication and interaction among the electronic components, electronic direction/motion sensing mechanism 16, rotation control circuit 24, and polarizing filter rotating mechanism 26, of device 10.

In Step (b), there is directing and setting the electromagnetic radiation receiver, and therefore, the polarizing filter frame, and the electronic direction/motion sensing mechanism, at reference directions relative to a fixed or stationary reference direction.

Electromagnetic radiation receiver 42 is directed and set at a reference direction, for example, first reference direction, RD1, relative to a fixed or stationary reference direction, FRD. Accordingly, polarizing filter frame 14 and electronic direction/motion sensing mechanism 16 are directed and set at second and third reference directions, RD2 and RD3, respectively, relative to the same fixed reference direction, FRD, since these components are connected and fixed to electromagnetic radiation receiver 42, as described above in Step (a). Furthermore, since polarizing filter frame 14 holds polarizing filter 12 in place, the direction of polarizing filter 12 is therefore set according to the reference direction RD2 of polarizing filter frame 14.

In actuality, the second and third reference directions, RD2 and RD3, of polarizing filter frame 14 and electronic direction/motion sensing mechanism 16, respectively, are expected to be only slightly different from the first reference direction, RD1, of electromagnetic receiver 42, due to the preferably close physical location of polarizing filter frame 14 and electronic direction/motion sensing mechanism 16 relative to electromagnetic radiation receiver 42, but, in practice, the second and third reference directions, RD2 and RD3, are functionally the same as the first reference direction, RD1, of electromagnetic radiation receiver 42.

The fixed or stationary reference direction, FRD, needs to remain essentially fixed or stationary only for the amount of time taken for implementing the present invention. Accordingly, the fixed or stationary reference direction, FRD, can change following completion of Step (a) through Step (f) of the method of the present invention.

For application of the present invention where electromagnetic radiation receiver 42 is a camera 42, and where incident electromagnetic radiation 36 is incident light 36 originating from a light source and propagating through an environment having features, such as scattering or reflecting objects or surfaces, causing the production of a significant amount of scattered light or reflected light, respectively, and where the scattered light or reflected light includes a noticeable amount of polarized scattered light or polarized reflected light, respectively, according to the previously described electromagnetic radiation polarizing mechanisms, an operator or photographer using polarizing filter 12 of camera 42 for improving, enhancing, or artistically affecting, the photographic imaging and/or focusing processes, directs and sets camera 42 at first reference direction, RD1, and therefore, polarizing filter frame 14, and electronic direction/motion sensing mechanism 16 at second and third reference directions RD2 and RD3, respectively, relative to a fixed or stationary reference direction, FRD.

The fixed reference direction, FRD, is preferably a well identified and remembered direction which is associated with an essentially fixed or stationary entity, for example, fixed or stationary entity 48. In photographic applications, the fixed reference direction, FRD, is associated with an essentially fixed or stationary naturally existing entity, for example, the sun, the moon, the north pole, the ocean, a mountain, a tree, or a river, or, an essentially fixed or stationary man made entity, for example, a tall or large building, or a vehicle.

For example, in the case where fixed or stationary entity 48 is the sun 48, according to well known practice in the art of photography, for minimizing atmospheric scattered light, camera 42 is directed and set in a direction perpendicular or 90° from sun 48, since this is the direction most strongly polarized scattered light propagates. For minimizing light reflected by a reflecting surface of media such as water or glass, camera 42 is directed and set in a direction, relative to sun 48, such that the reflected light enters polarizing filter 12, and therefore enters camera 42, along a line making an approximately 35° angle with the reflecting surface, since the Brewster's angle of such reflecting media is approximately 55 degrees, whereby for such reflecting media, the reflected light is entirely polarized and reflected perpendicular to the plane of incidence, that is, parallel or tangential to the reflecting surface of the water or glass. At other angles of incidence, reflected light from the surfaces of such media is only partially polarized, but the net polarization remains tangential to the reflecting surface, thereby still enabling effective usage of polarizing filter 12 and device 10 of the present invention.

Clearly, a fixed or stationary reference direction which is associated with exemplary entities such as the sun, the moon, or a vehicle, is not 'permanently' fixed or stationary, but, is 'temporarily' fixed or stationary, according to the absence of, or relatively insignificant, movement of the sun, the moon, or the vehicle, during the time period of implementing the method. Implementing the present invention simply requires that a selected temporarily fixed or stationary reference direction remains essentially fixed or stationary for as long as is required for completing the steps of the method.

In Step (c), there is rotating the polarizing filter around its optical axis and setting the polarizing filter within the polarizing filter frame to a first angular position, whereby a first fraction of the incident electromagnetic radiation is polarized by the polarizing filter for forming polarized electromagnetic radiation received by the electromagnetic radiation receiver.

Step (c) can be considered as a step for initializing or calibrating the angular position, AP, of polarizing filter 12 within polarizing filter frame 14.

Rotating polarizing filter 12 around its optical axis of rotation, for example, optical axis of rotation 38 in FIG. 1, by a rotation angle, hereinafter referred to as rotation angle A, is equivalent to rotating the polarizing filter 12 in the plane of polarizing filter frame 14, by rotation angle A. In principle, rotation angle A is an angle in the range of between 0° to 360°, but, in practice, rotation angle A is typically less than 180° for a single implementation of Step (c).

Rotating polarizing filter 12 around optical axis 38 by rotation angle A and setting polarizing filter 12 within polarizing filter frame 14 to a first angular position, AP1, whereby a first fraction, F1, of incident electromagnetic radiation 36 is polarized by polarizing filter 12 for forming polarized electromagnetic radiation 40 received by electromagnetic radiation receiver 42, is performed either manually or automatically. The angular position, AP, in general, and the first angular position, AP1, in particular, of polarizing filter 12 within polarizing filter frame 14, has a value in the range of between 0° to 360°. The manual procedure involves physically rotating polarizing filter 12 around optical axis 38 by rotation angle A, and setting polarizing filter 12 by fingers of an operator's hand. A preferred automatic procedure involves an operator activating rotation control circuit 24, whereby rotation control circuit 24 generates and sends a control signal to polarizing filter rotating mechanism 26, by way of control/data links 32, for automatically actuating polarizing filter rotating mechanism 26 which automatically rotates polarizing filter 12 around optical axis 38 to the first angular position, AP1.

The automatic procedure is performed, for example, by an operator pushing or turning an activating element such as a button, knob, switch, or lever, for example, activating element 50 of rotation control circuit 24, or, by an operator using electromagnetic radiation receiver 42 for sending a wired or wireless control signal, by way of optional wired or wireless control/data links 34, to rotation control circuit 24. In the latter example, electromagnetic radiation receiver 42, in addition to the structure and functionality as described above in Step (a), further includes optional electronic components, circuitry, hardware, and software (not shown), required for sending a wired or wireless control signal, by way of optional wired or wireless control/data links 34, to rotation control circuit 24.

Rotation control circuit 24, either electronically linked to polarizing filter rotating mechanism 26, as shown in FIG. 1, or, physically part of polarizing filter rotating mechanism 26, includes a variety of different types of standard and readily procurable electronic and computerized software and hardware devices, mechanisms, components, elements, and packages, required for electronically communicating and interacting with computerized electronic circuitry 46A or 46B of electronic direction/motion sensing mechanism 16, and required for electronically communicating and interacting with polarizing filter rotating mechanism 26, and, optionally, required for electronically communicating and interacting with electromagnetic radiation receiver 42, as indicated above in Step (c). Rotation control circuit 42 generates and sends a control signal, featuring data and/or information relating to angular positions and rotation of polarizing filter 12 within polarizing filter frame 14, for automatically actuating polarizing filter rotating mechanism 26, which automatically rotates polarizing filter 12 around optical axis 38 by a rotation angle, hereinafter referred to as rotation angle B, as shown in FIG. 1, to a pre-determined or selected angular position, AP.

Polarizing filter rotating mechanism 26 of device 10 is, preferably, physically connected and fixed to polarizing filter 12, by way of polarizing filter frame 14, as shown in FIG. 1. Alternatively, polarizing filter rotating mechanism 26, when at rest or in an inactive mode, is physically separate from, but, capable of physically connecting and engaging to polarizing filter 12, by way of polarizing filter frame 14.

Polarizing filter rotating mechanism 26 is designed, constructed, and operable for automatically receiving, and actuating in response to, control signals, featuring data and/or information relating to angular positions and rotation of polarizing filter 12 around optical axis 38 within polarizing filter frame 14, from rotation control circuit 24. Polarizing filter rotating mechanism 26 includes a variety of different types of standard and readily procurable electrical, mechanical, electromechanical, electronic, and, if necessary, computerized software and hardware, devices, mechanisms, components, elements, and packages, required for electronically communicating and interacting with rotation control circuit 24, and required for automatically rotating polarizing filter 12 around optical axis 38, by rotation angle A or rotation angle B, within polarizing filter frame 14 to the pre-determined or selected angular positions, AP. For example, polarizing filter rotating mechanism 26 includes metallic and/or non-metallic components such as gears, related gear elements, gear drive mechanisms and elements, transmission mechanisms and elements, belts, bearings, connectors, rings, washers, holders, mounts, and grooved or notched elements. For application of the present invention where electromagnetic radiation receiver 42 is a camera 42, polarizing filter rotating mechanism 26 is designed, configured, and made of standard materials used in the art of manufacturing photographic equipment for rotating a polarizing filter, such as polarizing filter 12, by way of a polarizing filter frame or holder, such polarizing filter frame 14.

In above described Step (a), there is providing incident electromagnetic radiation 36 propagating into polarizing filter 12, for forming polarized electromagnetic radiation 40 received by electromagnetic radiation receiver 42. In that step, the directions of electromagnetic radiation receiver 42, the direction of polarizing filter frame 14, and therefore, the direction of polarizing filter 12, and, the angular position, AP, of polarizing filter 12 within polarizing filter frame 14, were randomly or indiscriminately set for providing an initial extent or fraction, F, of incident electromagnetic radiation 36 polarized by polarizing filter 12 for forming polarized electromagnetic radiation 40 received by electromagnetic radiation receiver 42. Moreover, in Step (a), the fraction, F, of incident electromagnetic radiation 36 polarized by polarizing filter 12 for forming polarized electromagnetic radiation 40, is anywhere in a range from zero to one, according to the type and configuration of polarizing filter 12, and, according to the actual direction and the angular position, AP, of polarizing filter 12 relative to incident electromagnetic radiation 36.

In contrast, in Step (c), following Step (b) of setting electromagnetic radiation receiver 42, and polarizing filter frame 14 holding polarizing filter 12 in place, at the first and second reference directions, RD1, and RD2, respectively, relative to the fixed reference direction, FRD, there is discriminatingly rotating polarizing filter 12 around optical axis 38 by rotation angle A, and setting polarizing filter 12 within polarizing filter frame 14 to a definitively or intentionally selected first angular position, AP1, whereby a definitively or intentionally selected first fraction, F1, of incident electromagnetic radiation 36 is polarized by polarizing filter 12 for forming polarized electromagnetic radiation 40 received by electromagnetic radiation receiver 42. Typically, an operator gradually and discriminatingly rotates and sets, by at least one of the above described manual and automatic procedures, polarizing filter 12 around optical axis 38 by rotation angle A, within polarizing filter frame 14, for definitively or specifically selecting the first angular position, AP1, according to requirements or characteristics of a particular application involving the need for controlling the type and extent of polarized electromagnetic radiation 40 received by electromagnetic radiation receiver 42.

For application of the present invention where electromagnetic radiation receiver 42 is a camera 42, and where incident electromagnetic radiation 36 is incident light 36 originating from a light source and propagating through an environment having features, such as scattering or reflecting objects or surfaces, causing the production of a significant amount of scattered light or reflected light, respectively, and where the scattered light or reflected light includes a noticeable amount of polarized scattered light or polarized reflected light, respectively, according to the previously described electromagnetic radiation polarizing mechanisms, an operator or photographer using polarizing filter 12 of camera 42 for improving, enhancing, or artistically affecting, the photographic imaging and/or focusing processes, gradually and discriminatingly rotates and sets, by at least one of the above described manual and automatic procedures, polarizing filter 12 within polarizing filter frame 14, for definitively or specifically selecting the first angular position, AP1, according to requirements or characteristics of a particular photographic application.

In Step (d), there is rotating or panning the electromagnetic radiation receiver around a vertical axis of rotation of the electromagnetic radiation receiver by a rotation angle, for setting the polarizing filter frame and the electronic direction/motion sensing mechanism at new directions horizontally shifted, by a determinable amount relative to the reference directions of the polarizing filter frame and the electronic direction/motion sensing mechanism, respectively.

Rotating or panning electromagnetic radiation receiver 42 around a vertical axis of rotation, for example, vertical axis of rotation 52 in FIG. 1, of electromagnetic radiation receiver 42, by a rotation angle, hereinafter referred to as rotation angle C, is equivalent to rotating or panning electromagnetic radiation receiver 42 in a horizontal plane, such as that indicated by the x-y plane in reference coordinate system 54, by rotation angle C, located in the x-y plane. In principle, rotation angle C is an angle in the range of between 0° to 360°, but, in practice, rotation angle C is typically less than 90° for a single event of rotating or panning electromagnetic radiation receiver 42 around vertical axis of rotation 52.

Rotating or panning electromagnetic radiation receiver 42 around vertical axis of rotation 52 of electromagnetic radiation receiver 42 by rotation angle C is performed either manually or automatically. The manual procedure involves physically rotating or panning electromagnetic radiation receiver 42 around vertical axis of rotation 52 by at least one operator's hand while the operator stands in a constant position on the ground. A preferred automatic procedure involves an operator activating an external device or mechanism (not shown) operatively connected to and electronically communicating with electromagnetic radiation receiver 42 for automatically rotating electromagnetic radiation receiver 42 around vertical axis of rotation 52 by rotation angle C.

As a result of rotating or panning electromagnetic radiation receiver 42 by rotation angle C, polarizing filter frame 14 and electronic direction/motion sensing mechanism 16 are also rotated or panned by rotation angle C, whereby polarizing filter frame 14 and electronic direction/motion sensing mechanism 16 take on new directions horizontally shifted, by a determinable amount, referred to as $S_H$, relative to the second and third reference directions, RD2 and RD3, of polarizing filter frame 14 and electronic direction/motion sensing mechanism 16, respectively, previously set in Step (b). Accordingly, as polarizing filter 12 is held by polarizing filter frame 14, polarizing filter 12 also takes on a new direction horizontally shifted, by the determinable amount, $S_H$, relative to second reference direction, RD2.

This procedure causes a change in the fraction, F, from the first fraction, F1, set according to Step (c), to another fraction, F, of incident electromagnetic radiation 36 which is polarized by polarizing filter 12 for forming polarized electromagnetic radiation 40 received by electromagnetic radiation receiver 42. Typically, during operation of electromagnetic radiation receiver 42, for example, when rotating or panning electromagnetic radiation receiver 42, it is desired to control, either by keeping constant or by changing in a controlled manner, the fraction, F, of incident electromagnetic radiation 36 which is polarized by polarizing filter 12 for forming polarized electromagnetic radiation 40 received by electromagnetic radiation receiver 42. Accordingly, there is a need for enabling an operator to control the fraction, F, of incident electromagnetic radiation 36 which is polarized by polarizing filter 12 for forming polarized electromagnetic radiation 40 received by electromagnetic radiation receiver 42, which is described below in Steps (e) through (f).

For application of the present invention where electromagnetic radiation receiver 42 is a camera 42, and where incident electromagnetic radiation 36 is incident light 36 originating from a light source and propagating through an environment having features, such as scattering or reflecting objects or surfaces, causing the production of a significant amount of scattered light or reflected light, respectively, and where the scattered light or reflected light includes a noticeable amount of polarized scattered light or polarized reflected light, respectively, rotating or panning the camera by rotation angle C is a quite common procedure used in photography for photographing landscape or scenery using multiple fields of view, where at least some of the multiple fields of view correspond to a series of rotating or panning camera 42. Accordingly, Steps (e) through (f) described below enable a photographer to control the fraction, F, of incident light 36 polarized by polarizing filter 12 for forming polarized light 40 received by camera 42.

In Step (e), there is sensing, measuring, and converting the determinable amount of the horizontal shift by the electronic direction/motion sensing mechanism, for generating a signal corresponding to measurement of the determinable amount of the horizontal shift.

Electronic direction/motion sensing mechanism 16 featuring any of the electronic direction/motion sensors 44 described above in Step (a), that is, any electronic direction/motion sensor 44 selected from the group consisting of electronic magnetic sensors, electronic magneto-inductive sensors, electronic compass sensors, electronic gyroscope sensors, electronic gyrocompass sensors, electronic gyroradiation sensors, electronic radiocompass sensors, and electronic lasergyro sensors, operatively functioning with computerized electronic circuitry 46A or 46B, is used here for sensing, measuring, and converting the determinable amount, $S_H$, of the horizontal shift, into an appropriate shift measurement, referred to as $S_M$, for generating an electronic signal, $S_E$, corresponding to the shift measurement, $S_M$, of the determinable amount, $S_H$, of the horizontal shift in the direction of polarizing filter frame 14, and therefore, of polarizing filter 12, relative to reference direction RD2 of polarizing filter frame 14.

The determinable amount, $S_H$, of the horizontal shift is measured and converted into an analog or digital shift measurement, $S_M$, for example, expressed in units of degrees orientation relating to direction headings of a compass, or, expressed in units of circular or radial coordinates of a circular or radial grid or map encompassing the directions of electromagnetic radiation receiver 42, polarizing filter frame 14, electronic direction/motion sensing mechanism 42, and the fixed or stationary reference direction, FRD. Accordingly, computerized electronic circuitry 46 processes and converts the shift measurement, $S_M$, of the horizontal shift into an electronic signal, $S_E$, preferably digital, which is sent to rotation control circuit 24, by way of control/data links 30.

In Step (f), there is automatically rotating the polarizing filter around its optical axis and setting the polarizing filter within the polarizing filter frame in response to the generated signal corresponding to measurement of the determinable amount of the horizontal shift, to a second angular position, whereby a second fraction of the incident electromagnetic radiation is polarized by the polarizing filter for forming polarized electromagnetic radiation received by the electromagnetic radiation receiver.

Step (f) can be considered as a step for compensating, correcting, or adjusting the angular position, AP, of polarizing filter 12 within polarizing filter frame 14, in response to the rotation or panning of electromagnetic radiation receiver 42.

Similar to above described Step (c), rotating polarizing filter 12 around optical axis of rotation 38, by a rotation angle, rotation angle B, is equivalent to rotating the polarizing filter 12 in the plane, for example, z-y plane of reference coordinate system 54, of polarizing filter frame 14, by rotation angle B. In principle, rotation angle B is an angle in the range of between 0 to 360°, but, in practice, rotation angle B is typically less than 180° for a single implementation of Step (c).

Rotation control circuit 24, additionally described above in Step (c), generates and sends a control signal, referred to as $S_C$, in response to the electronic signal, $S_E$, corresponding to the shift measurement, $S_M$, of the determinable amount, $S_H$, of horizontal shift, generated and sent by computerized electronic circuitry 46, where the control signal, $S_C$, features data and/or information relating to angular positions and rotation of polarizing filter 12 within polarizing filter frame 14, for automatically actuating polarizing filter rotating mechanism 26, described above in Step (c), which automatically rotates polarizing filter 12 around optical axis 38 by rotation angle B, to a pre-determined or selected second angular position, AP2. The second angular position, AP2, of polarizing filter 12 within polarizing filter frame 14 has a value in the range of between 0° to 360°.

According to the second angular position, AP2, of polarizing filter 12, a second fraction, F2, in the range of between 0 and 1, of incident electromagnetic radiation 36 is polarized by polarizing filter 12 for forming polarized electromagnetic radiation 40 received by electromagnetic radiation receiver 42. Also, according to the second angular position, AP2, the second fraction, F2, is either the same as, or different from, previously set first fraction, F1 (described above in Step (c)), of incident electromagnetic radiation 36 polarized by polarizing filter 12 for forming polarized electromagnetic radiation 40 received by electromagnetic radiation receiver 42.

For application of the present invention where electromagnetic radiation receiver 42 is a camera 42, and where incident electromagnetic radiation 36 is incident light 36 originating from a light source and propagating through an environment having features, such as scattering or reflecting objects or surfaces, causing the production of a significant amount of scattered light or reflected light, respectively, and where the scattered light or reflected light includes a noticeable amount of polarized scattered light or polarized reflected light, respectively, according to the previously described electromagnetic radiation polarizing mechanisms, an operator or photographer using polarizing filter 12 of camera 42 is able to improve, enhance, or artistically affect, the photographic imaging and/or focusing processes, by previously selecting or programming into rotation control circuit 24 a set of the pre-determined or selected angular positions, AP, including values of the second angular position, AP2, based on requirements or characteristics of a particular photographic application.

Accordingly, for camera 42, Step (f) is performed by rotation control circuit 24 generating and sending the control signal, $S_C$, featuring one of the pre-determined angular positions, AP, such as that one corresponding to the second angular position, AP2, for automatically actuating polarizing filter rotating mechanism 26, which automatically rotates polarizing filter 12 around optical axis 38, by rotation angle B, to the predetermined or selected second angular position, AP2. According to the second angular position, AP2, the second fraction, F2, is either the same as, or different from, previously set first fraction, F1, of incident light 36 polarized by polarizing filter 12 for forming polarized light 40 received by camera 42.

The method of the present invention can be implemented in a variety of ways, such as according to the following different categories. Two commonly applicable different categories are described herein. It is noted that the present invention can be implemented according to additional different categories and corresponding different cases, and only selected examples are described herein.

In category (1), there is performing at least one more repetitions or sequences of a selected number of steps of the method, while maintaining the same first reference direction, RD1, of electromagnetic radiation receiver 42, and the same second and third reference directions, RD2 and RD3, of polarizing filter frame 14 and electronic direction/motion sensing mechanism 16, respectively, relative to the same fixed or stationary reference direction, FRD, and, maintaining the same vertical axis of rotation 52 of electromagnetic radiation receiver 42. For application of the present invention where electromagnetic radiation receiver 42 is a camera, category (1) corresponds to the relatively simple photographic procedure of repetitively or sequentially rotating or panning camera 42, in place, while maintaining the same first reference direction, RD1, of camera 42, and, maintaining the same vertical axis of rotation 52 of camera 42.

In case (i) of category (1), there is maintaining the same first fraction, F1, as set in Step (c), of polarized electromagnetic radiation 40 received by electromagnetic radiation receiver 42, for additional events of rotating or panning electromagnetic radiation receiver 42. Polarizing filter 12 is repetitively or sequentially automatically controlled by the method of the present invention further featuring Step (g), as follows.

In Step (g), there is repeating Step (d) through Step (f) for a different rotation angle, C' (not shown) around vertical axis of rotation 52 of electromagnetic radiation receiver 42, thereby producing a correspondingly different horizontal shift, $S'_H$, which is sensed, measured, converted, and used for automatically rotating polarizing filter 12 around optical axis 38, by rotation angle B' (not shown) to a different pre-determined or selected second angular position, AP2', whereby the second fraction, F2, is the same as the previously set first fraction, F1, of incident electromagnetic radiation 36 polarized by polarizing filter 12 for forming polarized light 40 received by electromagnetic radiation receiver 42.

In case (ii) of category (1), there is changing the first fraction, F1, of polarized electromagnetic radiation 40 received by electromagnetic radiation receiver 42. In this case, in Step (c), there is rotating polarizing filter 12 around optical axis 38 by rotation angle A' (not shown) and setting polarizing filter 12 within polarizing filter frame 14 to a different first angular position, AP1', corresponding to a different fraction, F1', of polarized electromagnetic radiation 40 received by electromagnetic radiation receiver 42. Then, there is performing Step (d) through Step (f), and optionally, Step (g), according to the particular application involving electromagnetic radiation receiver 42 and polarized electromagnetic radiation 40, for automatically controlling polarizing filter 12.

In category (2), there is changing the first reference direction, RD1, of electromagnetic radiation receiver 42, and optionally, the second and third reference directions, RD2 and RD3, of polarizing filter frame 14 and electronic direction/motion sensing mechanism 16, respectively, to different first reference direction, RD1', and optionally, different second and third reference directions, RD2' and RD3', respectively, collectively referred to as different reference directions, RDi', as shown in FIG. 1, relative to the same fixed or stationary reference direction, FRD, or, optionally, relative to a different fixed or stationary reference direction, FRD', associated with a different fixed or stationary entity 56, and, maintaining the same vertical axis of rotation 52 of electromagnetic radiation receiver 42. Then, there is performing Step (c) through Step (f), and optionally, Step (g), according to the particular application involving electromagnetic radiation receiver 42 and polarized electromagnetic radiation 40, for automatically controlling polarizing filter 12.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for automatically controlling a polarizing filter, the method comprising the steps of:
   (a) sensing by use of a sensing device at least one parameter associated with a direction of regard of the electromagnetic radiation receiver;
   (b) receiving a signal from said sensing device relating to said at least one parameter by a rotation control circuit; and
   (c) receiving a signal from said rotation control circuit relating to said at least one parameter associated with direction of the polarizing filter by a polarizing filter rotating mechanism for automatically rotating the polarizing filter.

2. The method of claim 1, wherein said at least one parameter associated with said direction of regard of the electromagnetic radiation receiver is selected from the group consisting of direction, position, change in direction, change in position, and motion.

3. The method of claim 1, wherein said at least one parameter associated with said direction of regard of the electromagnetic radiation receiver is selected from the group consisting of direction, position, change in direction, change in position, and motion, said at least one parameter is relative to at least one pre-determined fixed or stationary reference direction.

4. The method of claim 1, wherein said sensing device features electronic operation of electromechanical components and elements functioning according to phenomena selected from the group consisting of electricity, magnetism, gravity, motion, inertia, precession, propagation of electromagnetic radiation, and optics.

5. The method of claim 1, wherein said sensing device is physically connected to the polarizing filter in a configuration selected from the group consisting of indirectly physically connected to the polarizing filter and directly physically connected to the polarizing filter.

6. The method of claim 1, wherein said sensing device includes an electronic direction/motion sensor.

7. The method of claim 6, wherein said electronic direction/motion sensor is selected from the group consisting of electronic direction sensors, electronic position sensors, electronic direction change sensors, electronic position change sensors, electronic motion sensors, electronic inertial sensors, and electronic precession sensors.

8. The method of claim 6, wherein said electronic direction/motion sensor is selected from the group consisting of electronic magnetic sensors, electronic magneto-inductive sensors, electronic compass sensors, electronic gyroscope sensors, electronic gyrocompass sensors, electronic gyroradiation sensors, electronic radiocompass sensors, and electronic lasergyro sensors.

9. The method of claim 1, wherein said sensing device includes an electronic direction/motion sensor and computerized electronic circuitry.

10. The method of claim 9, wherein said computerized electronic circuitry is configured in a way selected from the group consisting of physically part of said sensing device, and, physically separate from and electronically linked to said sensing device.

11. The method of claim 9, wherein said computerized electronic circuitry includes a variety of components selected from the group consisting of electronic and computerized software and hardware devices, mechanisms, components, elements, and packages, for electronically communicating and interacting with said electronic direction/motion sensor and said rotation control circuit.

12. The method of claim 9, wherein electronic output of said electronic direction/motion sensor is analyzed and processed by said computerized electronic circuitry for determining said at least one parameter associated with said direction of regard of the electromagnetic radiation receiver.

13. The method of claim 1, wherein said rotation control circuit receives said signal from computerized electronic circuitry of said sensing device.

14. The method of claim 1, wherein said rotation control circuit is configured in a way selected from the group consisting of physically separate from and electronically linked to said polarizing filter rotating mechanism and physically part of said polarizing filter rotating mechanism.

15. The method of claim 1, wherein said rotation control circuit includes a variety of components selected from the group consisting of electronic and computerized software and hardware devices, mechanisms, components, elements, and packages, for electronically communicating and interacting with computerized electronic circuitry of said sensing device and said polarizing filter rotating mechanism.

16. The method of claim 1, wherein said signal received by said polarizing filter rotating mechanism from said rotation control circuit features data and information relating to angular positions and rotation of the polarizing filter.

17. The method of claim 1, wherein said polarizing filter rotating mechanism is configured in a way selected from the group consisting of physically connected and fixed to the polarizing filter, and, physically separate from and physically connectable and engageable to the polarizing filter.

18. The method of claim 1, wherein said polarizing filter rotating mechanism includes a variety of components selected from the group consisting of electrical, mechanical, electro-mechanical, electronic, computerized software and hardware, devices, mechanisms, components, elements, and packages, for electronically communicating and interacting with said rotation control circuit, and for automatically rotating the polarizing filter.

19. The method of claim 1, wherein said polarizing filter rotating mechanism includes components selected from the group consisting of metallic components and non-metallic components.

20. The method of claim 1, wherein said polarizing filter rotating mechanism includes components selected from the group consisting of gears, related gear elements, gear drive mechanisms and elements, transmission mechanisms and elements, belts, bearings, connectors, rings, washers, holders, mounts, and grooved or notched elements.

21. The method of claim 1, wherein said signal from said sensing device and said signal from said rotation control circuit are each of a mode selected from the group consisting of wired modes, wireless modes, and combinations of wired modes and wireless modes.

22. The method of claim 1, wherein said polarizing filter rotating mechanism rotates the polarizing filter by a rotation angle in the range between zero degrees and three-hundred and sixty degrees.

23. A device for automatically controlling a polarizing filter associated with an electromagnetic radiation receiver, comprising:
   (a) a sensing device for sensing at least one parameter associated with a direction of regard of the electromagnetic radiation receiver;

(b) a rotation control circuit for receiving a signal from said sensing device relating to said at least one parameter associated with said direction of regard of the electromagnetic radiation receiver; and (c) a polarizing filter rotating mechanism for receiving a signal from said rotation control circuit relating to said at least one parameter associated with said direction of regard of the electromagnetic radiation receiver for automatically rotating the polarizing filter.

24. The device of claim 23, wherein said at least one parameter associated with said direction of regard of the electromagnetic radiation receiver is selected from the group consisting of direction, position, change in direction, change in position, and motion.

25. The device of claim 23, wherein said at least one parameter associated with said direction of regard of the electromagnetic radiation receiver is selected from the group consisting of direction, position, change in direction, change in position, and motion, said at least one parameter is relative to at least one pre-determined fixed or stationary reference direction.

26. The device of claim 23, wherein said sensing device features electronic operation of electro-mechanical components and elements functioning according to phenomena selected from the group consisting of electricity, magnetism, gravity, motion, inertia, precession, propagation of electromagnetic radiation, and optics.

27. The device of claim 23, wherein said sensing device is physically connected to the polarizing filter in a configuration selected from the group consisting of indirectly physically connected to the polarizing filter and directly physically connected to the polarizing filter.

28. The device of claim 23, wherein said sensing device includes an electronic direction/motion sensor.

29. The device of claim 28, wherein said electronic direction/motion sensor is selected from the group consisting of electronic direction sensors, electronic position sensors, electronic direction change sensors, electronic position change sensors, electronic motion sensors, electronic inertial sensors, and electronic precession sensors.

30. The device of claim 28, wherein said electronic direction/motion sensor is selected from the group consisting of electronic magnetic sensors, electronic magneto-inductive sensors, electronic compass sensors, electronic gyroscope sensors, electronic gyrocompass sensors, electronic gyroradiation sensors, electronic radiocompass sensors, and electronic lasergyro sensors.

31. The device of claim 23, wherein said sensing device includes an electronic direction/motion sensor and computerized electronic circuitry.

32. The device of claim 31, wherein said computerized electronic circuitry is configured in a way selected from the group consisting of physically part of said sensing device, and, physically separate from and electronically linked to said sensing device.

33. The device of claim 31, wherein said computerized electronic circuitry includes a variety of components selected from the group consisting of electronic and computerized software and hardware devices, mechanisms, components, elements, and packages, for electronically communicating and interacting with said electronic direction/motion sensor and said rotation control circuit.

34. The device of claim 31, vherein electronic output of said electronic direction/motion sensor is analyzed and processed by said computerized electronic circuitry for determining said at least one parameter associated with said direction of regard of the electromagnetic radiation receiver.

35. The device of claim 23, wherein said rotation control circuit receives said signal from computerized electronic circuitry of said sensing device.

36. The device of claim 23, wherein said rotation control circuit is configured in a way selected from the group consisting of physically separate from and electronically linked to said polarizing filter rotating mechanism and physically part of said polarizing filter rotating mechanism.

37. The device of claim 23, wherein said rotation control circuit includes a variety of components selected from the group consisting of electronic and computerized software and hardware devices, mechanisms, components, elements, and packages, for electronically communicating and interacting with computerized electronic circuitry of said sensing device and said polarizing filter rotating mechanism.

38. The device of claim 23, wherein said signal received by said polarizing filter rotating mechanism from said rotation control circuit features data and information relating to angular positions and rotation of the polarizing filter.

39. The device of claim 23, wherein said polarizing filter rotating mechanism is configured in a way selected from the group consisting of physically connected and fixed to the polarizing filter, and, physically separate from and physically connectable and engageable to the polarizing filter.

40. The device of claim 23, wherein said polarizing filter rotating mechanism includes a variety of components selected from the group consisting of electrical, mechanical, electro-mechanical, electronic, computerized software and hardware, devices, mechanisms, components, elements, and packages, for electronically communicating and interacting with said rotation control circuit, and for automatically rotating the polarizing filter.

41. The device of claim 23, wherein said polarizing filter rotating mechanism includes components selected from the group consisting of metallic components and non-metallic components.

42. The device of claim 23, wherein said polarizing filter rotating mechanism includes components selected from the group consisting of gears, related gear elements, gear drive mechanisms and elements, transmission mechanisms and elements, belts, bearings, connectors, rings, washers, holders, mounts, and grooved or notched elements.

43. The device of claim 23, wherein said signal from said sensing device and said signal from said rotation control circuit are each of a mode selected from the group consisting of wired modes, wireless modes, and combinations of wired modes and wireless modes.

44. The device of claim 23, wherein said polarizing filter rotating mechanism rotates the polarizing filter by a rotation angle in the range between zero degrees and three-hundred and sixty degrees.

45. A device for automatically controlling a polarizing filter associated with an electromagnetic radiation receiver, wherein the polarizing filter polarizes electromagnetic radiation propagating into the polarizing filter for forming polarized electromagnetic radiation received by the electromagnetic radiation receiver, the device comprising:

(a) a sensing device for sensing at least one parameter associated with a direction of regard of the electromagnetic radiation receiver;

(b) a rotation control circuit for receiving a signal from said sensing device relating to said at least one parameter associated with said direction of regard of the electromagnetic radiation receiver; and (c) a polarizing filter rotating mechanism for receiving a signal from said rotation control circuit relating to said at least one parameter associated with said direction of regard of the electromagnetic radiation receiver for automatically rotating the polarizing filter associated with the electromagnetic radiation receiver.

46. The device of claim 45, wherein said at least one parameter associated with said direction of regard of the electromagnetic radiation receiver is selected from the group consisting of direction, position, change in direction, change in position, and motion.

47. The device of claim 45, wherein said at least one parameter associated with said direction of regard of the electromagnetic radiation receiver is selected from the group consisting of direction, position, change in direction, change in position, and motion, said at least one parameter is relative to at least one pre-determined fixed or stationary reference direction.

48. The device of claim 45, wherein said sensing device features electronic operation of electro-mechanical components and elements functioning according to phenomena selected from the group consisting of electricity, magnetism, gravity, motion, inertia, precession, propagation of electromagnetic radiation, and optics.

49. The device of claim 45, wherein said sensing device is physically connected to the polarizing filter in a configuration selected from the group consisting of indirectly physically connected to the polarizing filter and directly physically connected to the polarizing filter.

50. The device of claim 45, wherein said sensing device includes an electronic direction/motion sensor.

51. The device of claim 50, wherein said electronic direction/motion sensor is selected from the group consisting of electronic direction sensors, electronic position sensors, electronic direction change sensors, electronic position change sensors, electronic motion sensors, electronic inertial sensors, and electronic precession sensors.

52. The device of claim 50, wherein said electronic direction/motion sensor is selected from the group consisting of electronic magnetic sensors, electronic magneto-inductive sensors, electronic compass sensors, electronic gyroscope sensors, electronic gyrocompass sensors, electronic gyroradiation sensors, electronic radiocompass sensors, and electronic lasergyro sensors.

53. The device of claim 45, wherein said sensing device includes an electronic direction/motion sensor and computerized electronic circuitry.

54. A device for automatically controlling a polarizing filter associated with a photographic device, wherein the polarizing filter polarizes electromagnetic radiation propagating into the polarizing filter for forming polarized electromagnetic radiation received by the photographic device, the device comprising:

(a) a sensing device for sensing at least one parameter associated with a direction of regard of the electromagnetic radiation receiver;

(b) a rotation control circuit for receiving a signal from said sensing device relating to said at least one parameter associated with said direction of regard of the electromagnetic radiation receiver; and (c) a polarizing filter rotating mechanism for receiving a signal from said rotation control circuit relating to said at least one parameter associated with said direction of regard of the electromagnetic radiation receiver for automatically rotating the polarizing filter associated with the photographic device.

55. The device of claim 54, wherein said at least one parameter associated with said direction of regard of the electromagnetic radiation receiver is selected from the group consisting of direction, position, change in direction, chance in position, and notion.

56. The device of claim 54, wherein said at least one parameter associated with said direction of regard of the electromagnetic radiation receiver is selected from the group consisting of direction, position, change in direction, change in position, and motion, said at least one parameter is relative to at least one pre-determined fixed or stationary reference direction.

57. The device of claim 54, wherein said sensing device features electronic operation of electro-mechanical components and elements functioning according to phenomena selected from the group consisting of electricity, magnetism, gravity, motion, inertia, precession, propagation of electromagnetic radiation, and optics.

58. The device of claim 54, wherein said sensing device is physically connected to the polarizing filter in a configuration selected from the group consisting of indirectly physically connected to the polarizing filter and directly physically connected to the polarizing filter.

59. The device of claim 54, wherein said sensing device includes an electronic direction/motion sensor.

60. The device of claim 59, wherein said electronic direction/motion sensor is selected from the group consisting of electronic direction sensors, electronic position sensors, electronic direction change sensors, electronic position change sensors, electronic motion sensors, electronic inertial sensors, and electronic precession sensors.

61. The device of claim 59, wherein said electronic direction/motion sensor is selected from the group consisting of electronic magnetic sensors, electronic magneto-inductive sensors, electronic compass sensors, electronic gyroscope sensors, electronic gyrocompass sensors, electronic gyroradiation sensors, electronic radiocompass sensors, and electronic lasergyro sensors.

62. The device of claim 54, wherein said sensing device includes an electronic direction/motion sensor and computerized electronic circuitry.

63. A method for automatically controlling a polarizing filter, wherein the polarizing filter polarizes electromagnetic radiation propagating into the polarizing filter for forming polarized electromagnetic radiation received by an electromagnetic radiation receiver, the method comprising the steps of:

(a) sensing by use of a sensing device at least one parameter relating to a shift in a direction of regard of the electromagnetic radiation receiver caused by rotating the electromagnetic radiation receiver around an axis of rotation of the electromagnetic radiation receiver, for generating an electronic signal relating to said shift, said sensing device being physically connected and fixed to the electromagnetic radiation receiver;

(b) receiving said electronic signal from said sensing device relating to said shift in said direction of device being, by a rotation control circuit, for generating a control signal relating to angular positions and rotation of the polarizing filter; and (c) receiving said control signal from said rotation control circuit by a polarizing filter rotating mechanism for automatically rotating the polarizing filter around an optical axis of the polarizing filter to a predetermined angular position.

64. The method of claim 63, wherein said shift in said direction of regard of the electromagnetic radiation receiver is a horizontal shift.

65. The method of claim 63, wherein said at least one parameter relating to said shift in said direction of regard of the electromagnetic radiation receiver is selected from the group consisting of direction, position, change in direction, change in position, and motion.

66. The method of claim 63, wherein said at least one parameter relating to said shift in said direction of regard of the electromagnetic radiation receiver is selected from the group consisting of direction, position, change in direction, change in position, and motion, said at least one parameter is relative to at least one pre-determined fixed or stationary reference direction.

67. The method of claim 63, wherein said sensing device features electronic operation of electromechanical components and elements functioning according to phenomena selected from the group consisting of electricity, magnetism, gravity, motion, inertia, precession, propagation of electromagnetic radiation, and optics.

68. The method of claim 63, wherein said sensing device is physically connected to the polarizing filter in a configuration selected from the group consisting of indirectly physically connected to the polarizing filter and directly physically connected to the polarizing filter.

69. The method of claim 63, wherein said sensing device includes an electronic direction/motion sensor.

70. The method of claim 69, wherein said electronic direction/motion sensor is selected from the group consisting of electronic direction sensors, electronic position sensors, electronic direction change sensors, electronic position change sensors, electronic motion sensors, electronic inertial sensors, and electronic precession sensors.

71. The method of claim 69, wherein said electronic direction/motion sensor is selected from the group consisting of electronic magnetic sensors, electronic magneto-inductive sensors, electronic compass sensors, electronic gyroscope sensors, electronic gyrocompass sensors, electronic gyroradiation sensors, electronic radiocompass sensors, and electronic lasergyro sensors.

72. The method of claim 63, wherein said electronic direction/motion sensing mechanism includes an electronic direction/motion sensor and computerized electronic circuitry.

73. A device for automatically controlling a polarizing filter, wherein the polarizing filter polarizes electromagnetic radiation passing through the polarizing filter for forming polarized electromagnetic radiation received by an electromagnetic radiation receiver, comprising:
  (a) a polarizing filter frame for holding the polarizing filter, said polarizing filter frame being connected and fixed to the electromagnetic radiation receiver;
  (b) a sensing device for sensing at least one parameter relating to a shift in direction of regard of the electromagnetic radiation receiver caused by rotating the electromagnetic radiation receiver around an axis of rotation of the electromagnetic radiation receiver, and for generating an electronic signal relating to said shift, said sensing device being connected and fixed to the electromagnetic radiation receiver;
  (c) connecting and fixing elements for connecting and fixing said polarizing filter frame and said sensing device to the electromagnetic radiation receiver;
  (d) a rotation control circuit for receiving said electronic signal from said sensing device relating to said shift in said direction of regard of the electromagnetic radiation receiver, and for generating a control signal relating to angular positions and rotation of the polarizing filter within said polarizing filter frame; and
  (e) a polarizing filter rotating mechanism for receiving said control signal from said rotation control circuit, for automatically rotating the polarizing filter around an optical axis of the polarizing filter to a pre-determined angular position.

74. The device of claim 73, wherein said shift in said direction of regard of the electromagnetic radiation receiver is a horizontal shift.

75. The device of claim 73, wherein said at least one parameter relating to said shift in said direction of regard of the electromagnetic radiation receiver is selected from the group consisting of direction, position, change in direction, change in position, and motion.

76. The device of claim 73, wherein said at least one parameter relating to said shift in said direction of regard of the electromagnetic radiation receiver is selected from the group consisting of direction, position, change in direction, change in position, and motion, said at least one parameter is relative to at least one pre-determined fixed or stationary reference direction.

77. The device of claim 73, wherein said sensing device features electronic operation of electromechanical components and elements functioning according to phenomena selected from the group consisting of electricity, magnetism, gravity, motion, inertia, precession, propagation of electromagnetic radiation, and optics.

78. The device of claim 73, wherein said sensing device is connected to the polarizing filter in a configuration selected from the group consisting of indirectly physically connected to the polarizing filter and directly physically connected to the polarizing filter.

79. The device of claim 73, wherein said sensing device includes an electronic direction/motion sensor.

80. The device of claim 79, wherein said electronic direction/motion sensor is selected from the group consisting of electronic direction sensors, electronic position sensors, electronic direction change sensors, electronic position change sensors, electronic motion sensors, electronic inertial sensors, and electronic precession sensors.

81. The device of claim 79, wherein said electronic direction/motion sensor is selected from the group consisting of electronic magnetic sensors, electronic magneto-inductive sensors, electronic compass sensors, electronic gyroscope sensors, electronic gyrocompass sensors, electronic gyroradiation sensors, electronic radiocompass sensors, and electronic lasergyro sensors.

82. The device of claim 73, wherein said sensing device includes an electronic direction/motion sensor and computerized electronic circuitry.

83. A method for automatically adjusting a rotational angle of a polarizing filter associated with an electromagnetic radiation receiver, the method comprising the steps of:
  (a) monitoring by use of a sensing device at least one parameter associated with a direction of regard of the electromagnetic radiation receiver; and
  (b) adjusting by use of a drive system the rotational angle of the polarizing filter as a function of at least said at least one parameter.

84. The method of claim 83, wherein said at least one parameter is indicative of an angle of said direction of regard about a vertical axis.

* * * * *